United States Patent [19]
Jakel

[11] 3,870,777

[45] Mar. 11, 1975

[54] CEMENTITIOUS ROOFING AND SIDING PRODUCTION

[75] Inventor: Gus R. Jakel, Glendale, Calif.

[73] Assignee: California Cement Shake Co., Inc., Alhambra, Calif.

[22] Filed: Nov. 2, 1972

[21] Appl. No.: 303,225

[52] U.S. Cl. ............... 264/71, 249/113, 264/86, 264/293, 264/313, 264/316, 264/333, 264/338, 425/425, 425/DIG. 119

[51] Int. Cl. ............................................ B28b 21/16

[58] Field of Search .......... 264/71, 72, 87, 86, 313, 264/325, 338, 293, 316, 333; 249/112, 113; 425/DIG. 425

[56] References Cited
UNITED STATES PATENTS

| | | | |
|---|---|---|---|
| 290,443 | 12/1983 | Magowan | 264/338 |
| 871,524 | 11/1907 | Pulverman | 425/DIG. 119 |
| 1,281,577 | 10/1918 | Jagenburg | 425/DIG. 119 |
| 1,396,468 | 11/1921 | Schwarz | 425/DIG. 425 |
| 1,433,864 | 10/1922 | Williams | 425/DIG. 119 |
| 1,694,563 | 12/1928 | Ross | 264/71 |
| 2,066,550 | 1/1937 | Batcheller | 264/86 X |
| 2,183,965 | 12/1939 | Ledeboer | 264/86 |
| 2,311,588 | 2/1943 | Denning | 264/87 |
| 2,368,975 | 2/1945 | Dinkfeld | 264/86 X |
| 2,407,514 | 9/1946 | Rembert | 264/313 X |

Primary Examiner—Robert F. White
Assistant Examiner—Thomas P. Pavelko
Attorney, Agent, or Firm—William W. Haefliger

[57] ABSTRACT

A cementitious product slab useful in construction is made by:
 a. preparing a flowable aqueous cementitious slurry,
 b. forming a selected quantity of the slurry into slab shape, said forming step including vibrating said slurry quantity to aid slab shape formation,
 c. pressurizing the formed slab to squeeze water therefrom, and
 d. curing the resultant slab.

7 Claims, 10 Drawing Figures

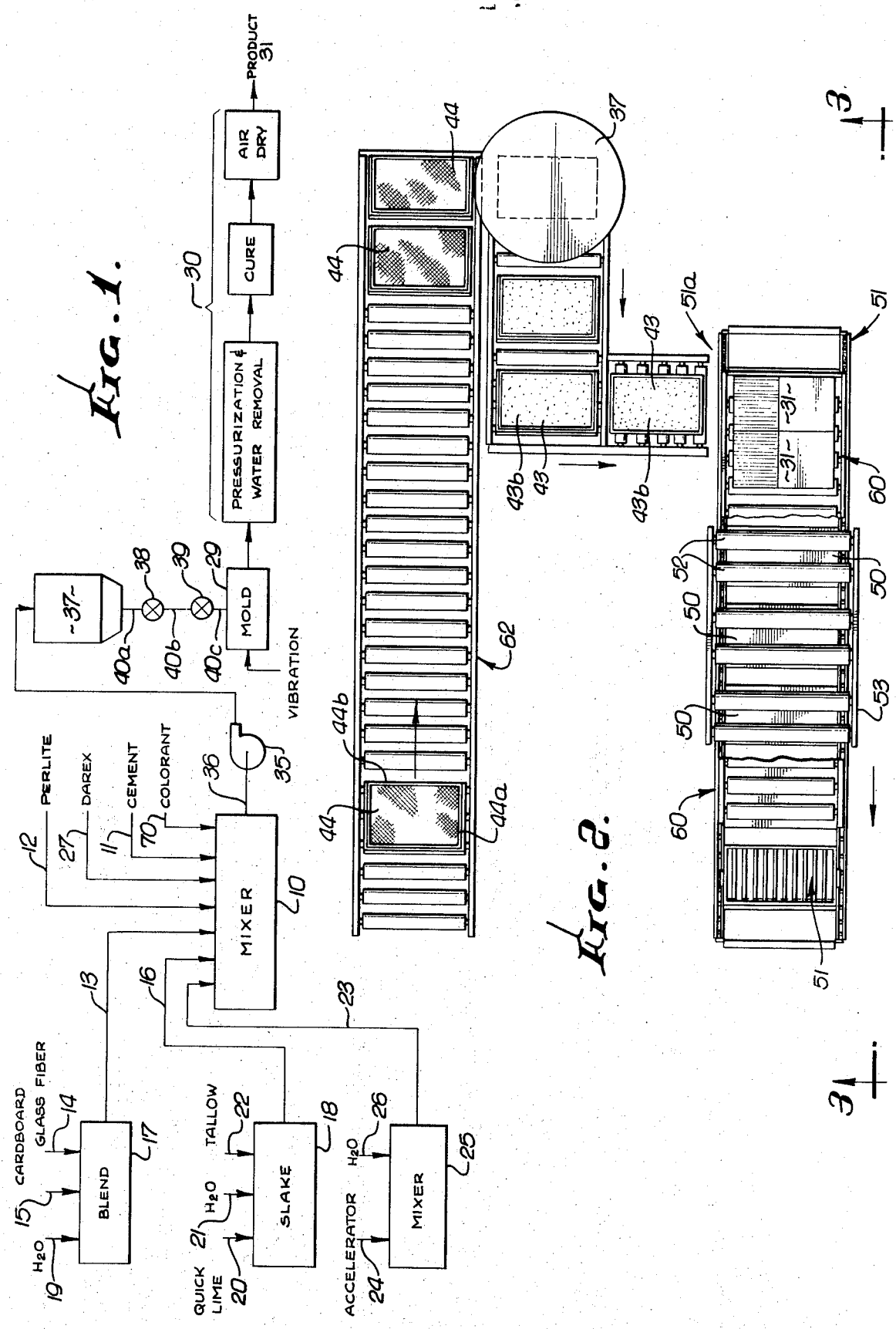

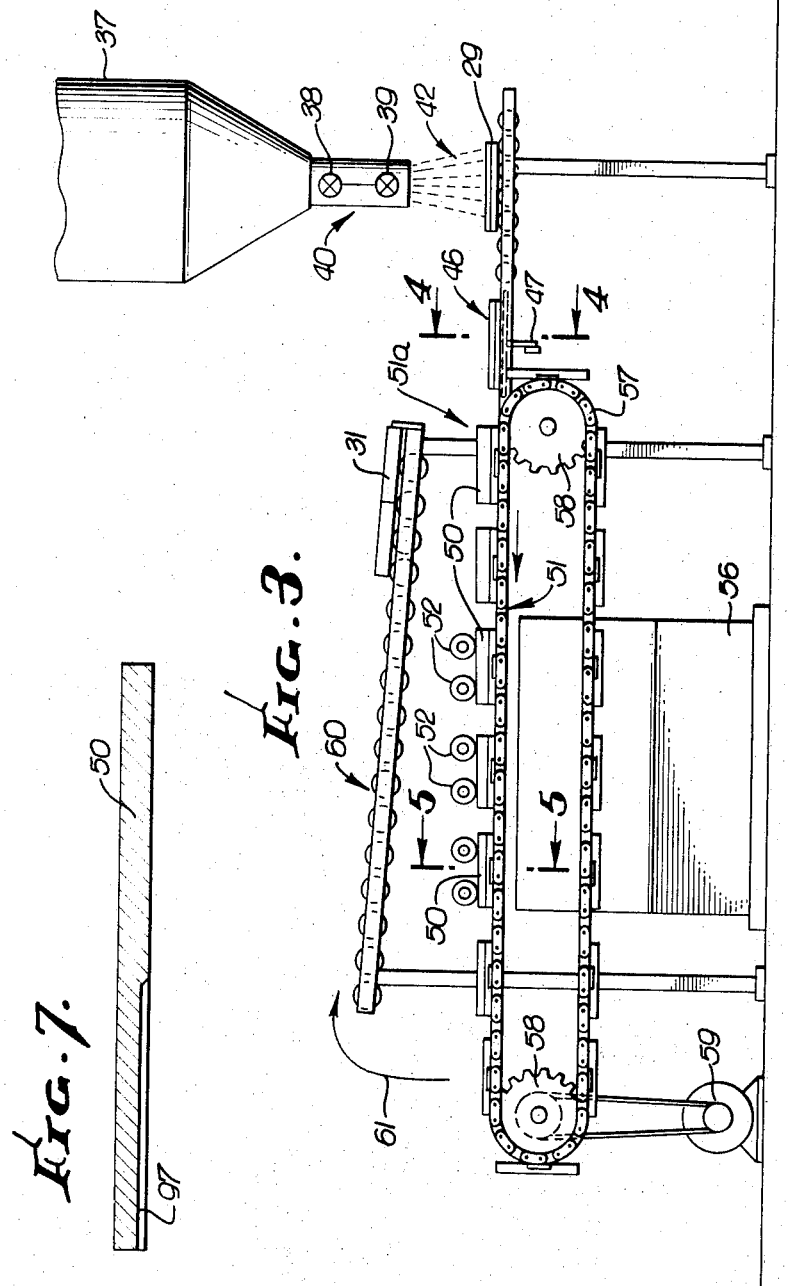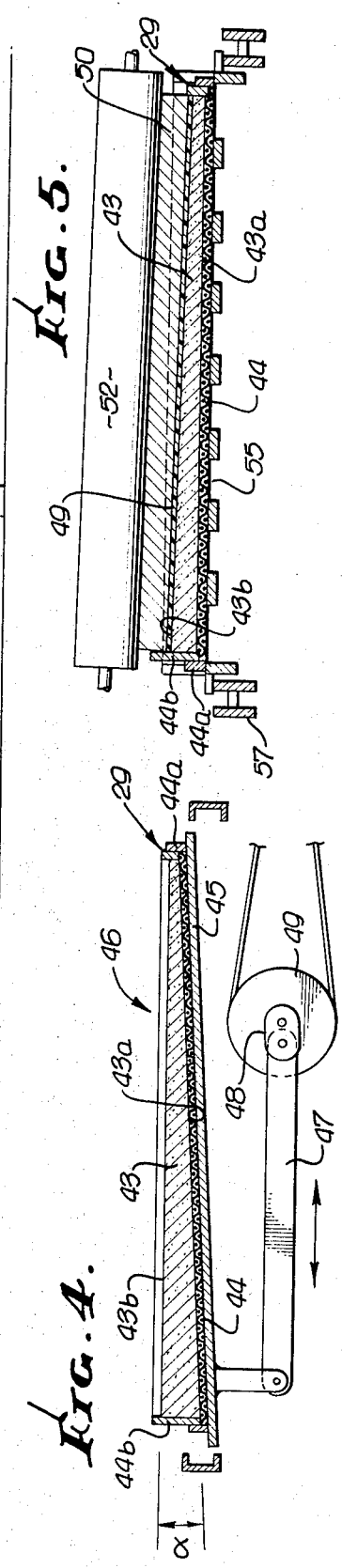

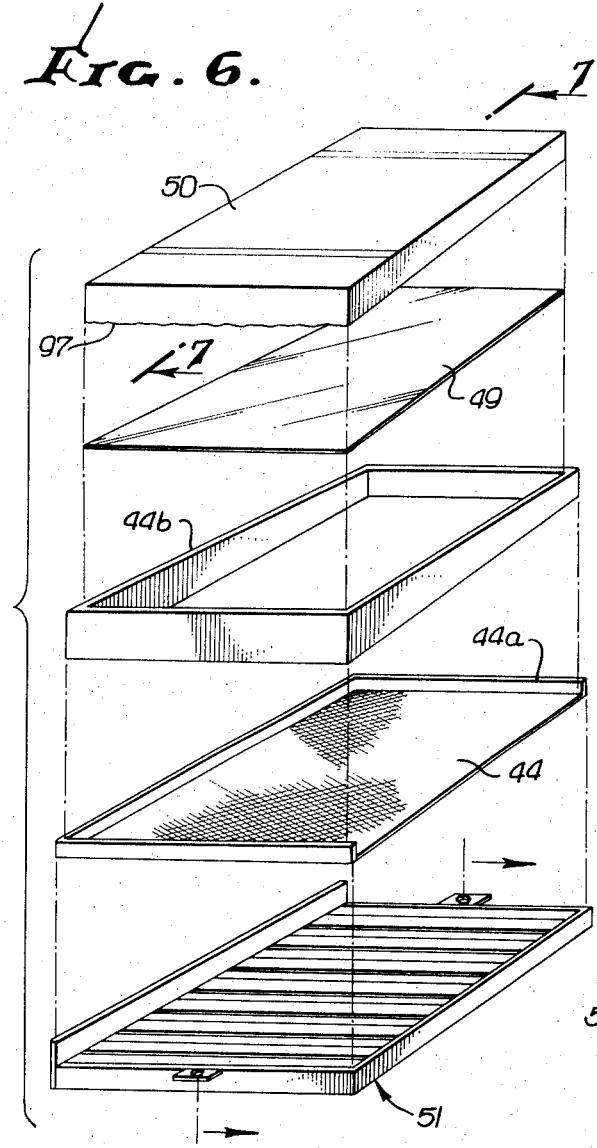
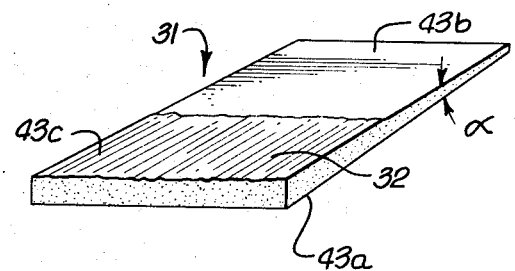
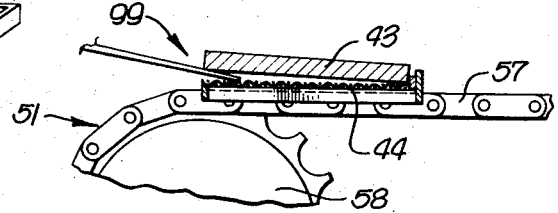
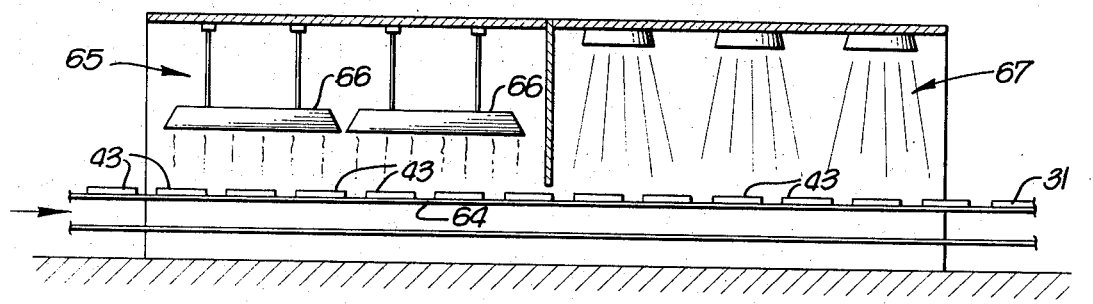

CEMENTITIOUS ROOFING AND SIDING PRODUCTION

BACKGROUND OF THE INVENTION

This invention relates generally to the production of lightweight, fireproof roofing and siding as used in construction, and more particularly concerns apparatus used in such production.

There is a continuing need for products as referred to which have the following characteristics: relatively lightweight, fireproof, waterproof, nailable, insulative and relatively inexpensive. For example, there is need for fireproof, cementitious shake roofing which will not impose loads greater than 700 pounds per 100 square feet of roof area, to meet standard construction codes. Insofar as use are aware, there is no known product embodying all of the above characteristics, and which can be made by the unusually advantageous appartus to be described herein.

SUMMARY OF THE INVENTION

It is a major object of the invention to provide apparatus and process to produce cementitious product slabs, as for example shingles or shakes, and incorporating means to produce a flowable aqueous cementitious slurry; means to receive a selected quantity of the slurry, to form same into slab shape and to vibrate the formed slab; means to pressurize a sequence of the formed slabs to squeeze water from them, and means to cure the resultant slabs. As will be seen, the forming of the slabs is carried out while maintaining their upper faces free to assume generally horizontally flat configuration, and structure is provided to support the slabs in such manner as to allow drainage of water during pressurization. Also, where shakes are to be produced, that structure supports the slab undersides with inclination relative to horizontal so that the shakes are tapered.

The pressurization apparatus may advantageously include a mold imparting to the slab upper surface a striated configuration, as will be seen, and a plastic film may be employed between the mold and the slab to facilitate mold separation. Such pressurization is typically carried out while the slab or slabs are transported, and the slab undersides may be supported at multiple closely spaced location to pass freed water downwardly. The resultant product slabs may be cured in kiln and air drying apparatus to be described.

These and other objects and advantages of the invention, as well as the details of an illustrative embodiment, will be more fully understood from the following description and drawings, in which:

DRAWING DESCRIPTION

FIG. 1 is a flow diagram;

FIG. 2 is a plan view of pressurization and water removal apparatus;

FIG. 3 is a side elevation showing the FIG. 2 apparatus;

FIG. 4 is an enlarged sectional elevation taken on lines 4—4 of FIG. 3;

FIG. 5 is an enlarged sectional elevation taken on lines 5—5 of FIG. 3;

FIG. 6 is an exploded perspective showing of shake molding components, as used during curing;

FIG. 7 is a section taken in elevation on lines 7—7 of FIG. 6;

FIG. 8 is an enlarged elevation showing shake removal from the FIGS. 2 and 3 apparatus;

FIG. 9 is a perspective showing of the product shake; and

FIG. 10 is a section taken in elevation through product curing apparatus.

DETAILED DESCRIPTION

In the drawings, an aqueous admixture is formed at 10 by combining Portland cement 11, perlite 12 (volcanic glass powder), an aqueous feed stream 13 of glass fiber 14 and cellulose 15 (such as cardboard), and a slaked lime feed stream 16. As will appear, the glass fiber and cellulose may be preliminarily blended with water 19 at 17, and the slaked lime feed may be preliminarily formed at 18 by combining quick lime 20, water 21 and tallow 22. Further, an aqueous feed stream 23 may be added to the mix at 10, stream 23 consisting of an accelerator 24 pre-blended at 25 with water 26. Finally, a small amount of Darex may be added at 27 to the mix 10, with colorant addition at 70. Roofing or siding slabs are formed from the mix as indicated, for example, by the molding step 29, and the slabs are cured as indicated at 30 to produce the product at 31. As previously brought out, the product is characterized as relatively lightweight, fireproof, inexpensive, waterproof, resilient enough to be sawable and nailable and highly thermally insulative. In particular, the mix is unusually well adatped to molding and curing in the from of shingles such as "shakes" having decorative undulations as seen at 32 in FIG. 9.

More particularly, best results are achieved when the constituents of the admixture at 10 are present in the following relative amounts:

| a) Between | 180 | and | 195 pounds of Portland cement |
| b) Between | 72 | and | 90 pounds of Perlite |
| c) Between | 4 | and | 8 ounces of Darex |
| d) Between | 38 | and | 46 gallons of feed stream 13 |
| e) Between | 7 | and | 9 gallons of feed stream 16 |
| f) Between | .6 | and | 1 gallons of feed stream 23. |

Portland cement is used to provide fireproofing, and Perlite makes the product lightweight and permits sawing and nailing as well as enhancing waterproofing.

One example of the foregoing is as follows: combine 44 gallons of feed stream 13, ¾ gallons of feed stream 23, 4 ounces of Darex, and a selected colorant, if desired, and mix for 1 minute. Next add 8 gallons of feed stream 16 and 188 pounds of Portland cement to the admixture and mix for 2 minutes. Finally, add 84 pounds of Perlite (Redco Inc type 27) to the admixture and mix for 4 minutes. The resultant admixture is then ready to be processed as at 29 and 30 for formation of the product. Darex, a product of W. R. Grace Co., consists of an air entraining agent.

Referring to the blending step 17, for best results and in terms of relative amounts between 40 and 48 pounds of scrap cardboard is combined with between 2 and 4 pounds of glass fiber (the glass and wood fibers add strength to the product) and between 350 and 375 gallons of water, for blending to produce a homogeneous pulp providing feed stream 13. In the slaking process designated at 18, for best results and in terms of relative amounts, between 45 and 55 pounds of quick lime is combined with between 25 and 30 gallons of water to react exothermically due to rapid hydration. Between 1.5 and 2.5 gallons of tallow is then added and blended in the hot mix (for waterproofing of the product) and to produce feed stream 16. Finally, in the mixing process designated at 25, between 3 and 5 pounds of accelerator powder is dissolved in between 1 and 3 gallons of hot water to produce feed stream 23. One usually advaantageous accelerator (which tends to cause the product to set up rapidly and assists in the waterproofing) consists principally of calcium chloride, calcium nitrate and potassium chloride, and has the following approximate composition, on a relative weight basis:

|  | | |
|---|---|---|
| | $CuCl_2$ | 1.3% |
| | $KCl$ | 6.0% |
| | $CaCl_2$ | 50.1% |
| | $Cl_2(SO_4)_3$ | 2.7% |
| | $Ca(NO_3)_2$ | 15.9% |
| Other | (water and impurities) | balance |

One example of the foregoing is as follows: 4 pounds of accelerator powder, as for example Berylex compound (a product of Berylex National Sales division of Harry Warde and Co., Kansas City, Missouri) is dissolved in 2 gallons of hot water to produce stream 23.

A typical mix at 10 has the following weight percent composition:

| Ingredient | Weight Percentage | Range |
|---|---|---|
| Water | 57.91 | 55 to 60 |
| Waste Cardboard (organic) | .75 | .50 to 1.0 |
| Fiberglass | .03 | 0 to .1 |
| Berylex | .20 | .20 to .50 |
| Lime | 2.2 | 2.0 to 3.0 |
| Tallow (organic) | .52 | .4 to 1.0 |
| Darex | .03 | .02 to .04 |
| Color | 1.1 | 0 to 2.0 |
| Cement | 25.66 | 20 to 30 |
| Perlite | 11.6 | 10 to 15 |

Referring again to FIG. 1, 35 designates a pump whose intake is connected to the outlet 36 of mixer 10, and whose outlet delivers the mix to a hopper 37. From the latter, controlled amounts of the mix are gravity fed to mold 29 as via a lock defined by upper and lower valves 38 and 39 connected in the delivery line 40 defined by stretches 40a, 40b and 40c.

Extending the description to FIGS. 3, 4 and 6 the mix is delivered at 42 into mold 29, where it assumes slab form 43 and is supported on a flat screen 44, which is inclined a few degrees from horizontal, as shown. The screen is in turn supported by inclined plate 45. Further, a rectangular frame 44b supported on plate 45 fits within screen frame 44a and confines the periphery of the slab to have rectangular shape.

Next, the above assembly is transferred to a station 46 and subjected to generally horizontal and rapid vibration. For this purpose, the plate 45 may be connected by link 47 to a small crank 48 rotated by a driven rotor 49. For example, the vibration amplitude may be about ⅜ inch and frequency about 300 cycles per minute. As a result, the top surface of the uncured material defining the slab 43 assumes a horizontal level, while the overall slab itself is tapered as seen in FIG. 4, the vibration direction indicated by the arrows below link 47 is in the slab or shingle taper direction. Note that plate 45 may support the screen 44 and the underside 43a of the slab at an angle α from horizontal, during such vibration, to form the slab with product shake wedge angularity as also appears in FIG. 9.

Thereafter the assembly including screen 44 and mold 29 is transferred (as at 51a in FIG. 2) onto a conveyor 51, and a thin separator sheet 49 (as for example a plastic film) is placed over the top surface 43b of the material 43. A rectangular mold and pressure plate 50 is placed over that sheet and fitted in the frame 46. Upon movement of the conveyor 51 to the left in FIGS. 2 and 3, the plate 50 is successively increasingly pressurized by a series of angled compression rollers 52 which may be interconnected as at 53. As a result, the mold plate 50 transmits increasing pressure transferred through the film 49 to the slab 43, for squeezing water from the material, in order to aid in curing of the latter. The paper pulp fibers act to retain the cement in the product during such pressing. Also, an irregularly striated surface may be formed on the material as at 43c in FIG. 9, the mold plate having a correspondingly striated surface 97 facing the slab.

The conveyor itself may have drain passages 55 formed therein, as seen in FIG. 5, and water removed from the material may be collected in a trough indicated at 56 in FIG. 3. Note that plate 45 is not present in FIG. 5, and that rollers 52 are inclined from horizontal. Endless conveyor chains are seen at 57, with sprockets 58 and drive 59. Following completion of such pressurization, the mold plates are removed and placed on an inclined return conveyor 60, such transfer of the plates being indicated by arrow 61 in FIG. 3. The frame 44b is removed from the product slab 43, and the latter may be scooped off the screen 44 as indicated at 99 in FIG. 8. The use of a 20 mesh, 0.016 inch screen allows the product to be easily removed, intact, and without locking. The screen 44 (and assoicated frame 44a together with the frame 44b may be placed on a return conveyor 62 seen in FIG. 2, for transfer and re-use in the manner previously described.

Finally, the slab or wedge 43, after removal of the separator sheet 49, may be placed on a support 64 in oven 65 seen in FIG. 10, and subjected to heat radiation from lamps 66, after which the shakes are air dried in chamber 67 and heated to complete the cure. As will be clear, the apparatus is especially well adapted to forming cementitious shakes on a production line basis.

I claim:

1. In the method of making a cementitious product slab useful in construction, and employing a generally rectangular mold frame, a screen and a plate, the steps that include a. preparing a flowable aqueous cementitious slurry consisting of about 58 percent water, about 39.5 percent lime, cement and perlite and the balance being non-aqueous components, b. forming a selected quantity of the slurry into tapered slab shape, said forming step including supporting the mold frame and screen on the plate with the screen overlying the plate and inclined relative to horizontal, transferring said slurry quantity into the mold frame and onto the inclined screen, and vibrating said mold frame and screen via vibration transmission to said plate in the general direction of said taper and at a frequency of about 300 cycles per second and an amplitude of about ⅜ inch thereby vibrating said slurry quantity to aid slab shape formation, said forming step carried out with the upper surface of the slab maintained free to assume a generally horizontally flat configuration in response to said vibration and in the absence of direct pressurization of said surface, and including the step of maintaining the screen in supporting relation to the underside of the slab and to have inclination relative to said upper surface during said forming step so that the resultant slab has tapered shape, c. thereafter transferring the mold frame and screen to a pressurizing station and pressurizing the formed slab supported on the screen to squeeze water therefrom by subjecting the tapered slab to a sequence of pressurization applications, and d. curing the resultant slab.

2. The method of claim 1 wherein the resultant slab comprises a shingle.

3. The method of claim 1 including the step of also molding an irregularly striated surface configuration in the slab upper surface during said pressurizing step.

4. The method of claim 1 wherein said pressurization of the slab is effected by transmitting pressure against the slab upper surface through a removable plastic film applied to the slab upper surface.

5. The method of claim 4 including the step of also molding an irregularly striated surface configuration in a portion of the slab upper surface by transmission of said pressure through said film via a pressure plate defining said striated surface configuration.

6. The method of claim 4 wherein said slab is transported during said pressurization and said pressurization is increased during said transportation.

7. In the method of making a cementitious product shingle useful in construction, and employing a generally rectangular mold frame, a screen and a plate, the steps that include a. preparing a flowable aqueous cementitious slurry consisting of about 58 percent water, about 39.5 percent lime, cement and perlite and the balance being non-aqueous components, b. forming a selected quantity of the slurry into tapered shingle shape, said forming step including supporting the mold frame and screen on the plate to vibrate as a unit with the screen overlying the plate and inclined relative to horizontal, transferring said slurry quantity into the mold frame and onto the inclined screen, and vibrating said mold frame and screen via vibration transmission to said plate in the direction of said taper thereby vibrating said slurry quantity to effect shingle shape formation, said forming step carried out with the upper surface of the shingle maintained free to assume a generally horizontally flat configuration in response to said vibration and in the absence of direct pressurization of said surface, and including the step of maintaining the screen in supporting relation to the underside of the sheet and to have inclination relative to said upper surface during said forming step so that the resultant shingle has tapered shape, c. thereafter transferring the mold frame and screen to a pressurization station and pressurizing the formed shingle supported on the screen to squeeze water therefrom by subjecting the tapered shingle to a sequence of pressurization applications, and d. curing the resultant shingle.

* * * * *

UNITED STATES PATENT OFFICE
CERTIFICATE OF CORRECTION

PATENT NO. : 3,870,777
DATED : March 11, 1975
INVENTOR(S) : Gus R. Jakel

It is certified that error appears in the above-identified patent and that said Letters Patent are hereby corrected as shown below:

Column 4, line 64; "cycles per second and an amplitude of about 3/8" should read --cycles per minute and an amplitude of about 3/8--

Signed and Sealed this

Seventh Day of February 1978

[SEAL]

Attest:

RUTH C. MASON
Attesting Officer

LUTRELLE F. PARKER
Acting Commissioner of Patents and Trademarks